UNITED STATES PATENT OFFICE.

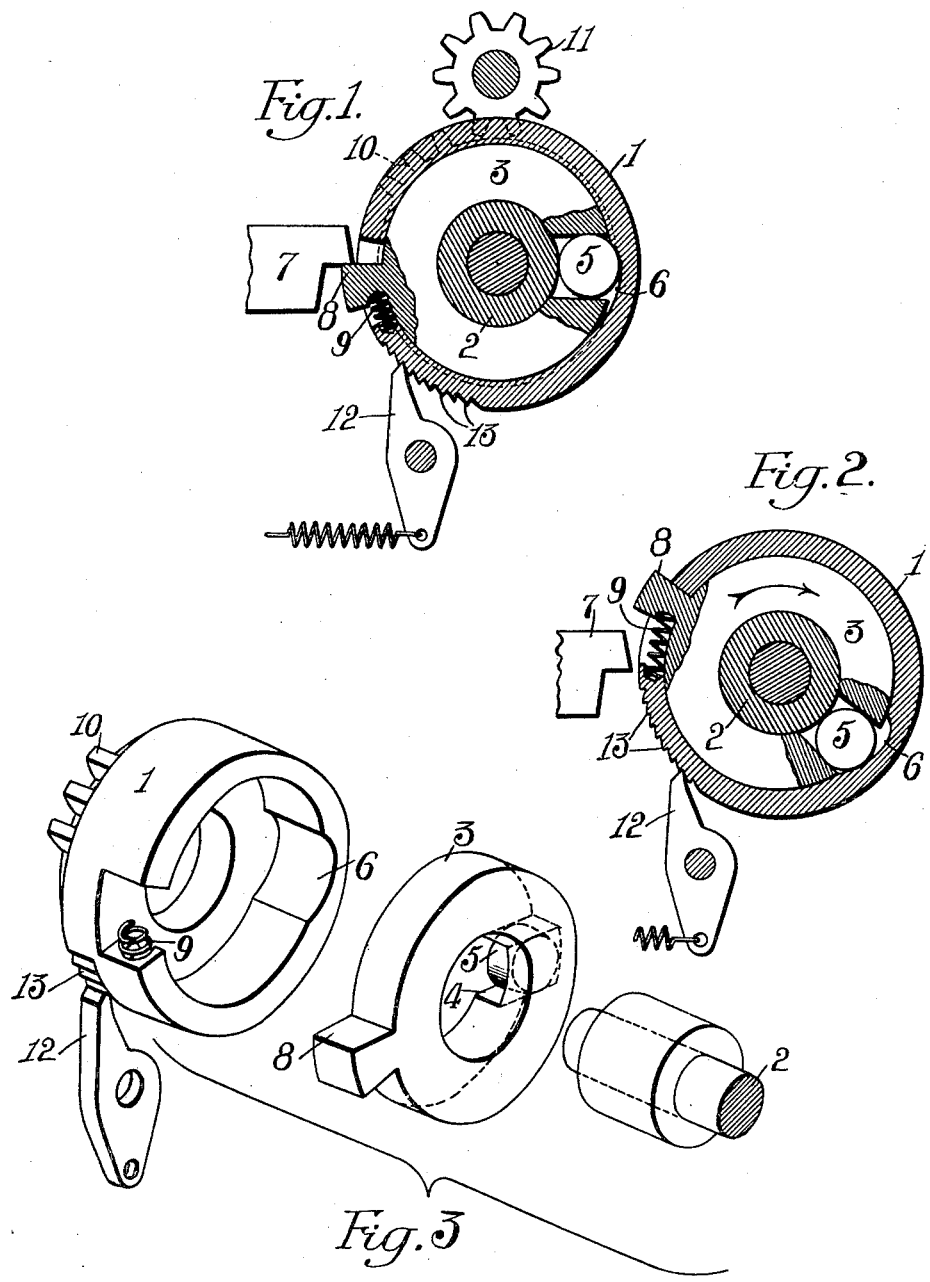

WALTER E. BARNARD, OF HARTFORD, CONNECTICUT, ASSIGNOR TO JOHN T. UNDERWOOD, OF BROOKLYN, NEW YORK.

CLUTCH.

1,090,444.   Specification of Letters Patent.   Patented Mar. 17, 1914.

Application filed October 28, 1912. Serial No. 728,034.

*To all whom it may concern:*

Be it known that I, WALTER E. BARNARD, a citizen of the United States, residing in Hartford, in the county of Hartford and State of Connecticut, have invented certain new and useful Improvements in Clutches, of which the following is a specification.

My invention relates to improvements in clutches, such for instance as disclosed in my application No. 707,153, filed July 2, 1912, and used in connection with a typewriter-computing machine of the master wheel class. In machines of this class, normally open clutches are individually closable by the numeral keys. These clutches are connected respectively to mutilated gears having teeth corresponding respectively with the numeral keys; as for instance, the "1" key controls the gear having one tooth; the "2" key controls the gear having two teeth, etc. When the clutch makes a revolution, its gear engages a train of gearing whose movement is carried by means of the master wheel into a totalizer. It is desirable to use an instantly gripping clutch to avoid any loss of time between the depression of the key and the operating of the computing mechanism. The clutch itself preferably comprises a constantly rotating member contained in a cup, in which is housed a gripping ball or roll to connect the cup to the rotating member. At a high speed, there is apt to be a rebound of the clutch when arrested at the conclusion of its stroke; such arrest being caused by a stop which is moved into the path of a projection of said clutch, and which also releases the clutch. As the clutch rebounds, it automatically closes again, and accordingly is reversed and strikes the stop a second time. This rebounding continues and causes the clutch to chatter.

The object of the invention is to prevent the rebound of the clutch.

In typewriter-computing machines of this type, an instantly gripping clutch is used to avoid any loss of time between the depression of the key and the closing of the clutch to effect the computation, as it is desirable to complete the computation before the type strikes the platen, in order that there may be no possibility of writing a new figure before the last one has been entirely computed in its proper column. The clutch generally comprises a cup in which a gripping member is controlled so that it may grip a rotating shaft at will, to cause the clutch cup to rotate, and will be more clearly described in the annexed specification.

In the accompanying drawings, Figure 1 shows a sectional view of a clutch with my improvement attached. Fig. 2 shows the clutch closed and starting it to revolve. Fig. 3 is a perspective showing the assembling of the clutch.

The clutch consists of a casing 1 surrounding a constantly rotating shaft 2, and a ring 3 in said casing provided with a recess 4 to hold and control a gripping roll 5 between the casing 1 and shaft 2. Normally the roll 5 is held loosely in a depression 6 in the inner side of the casing 1, so that shaft 2 may rotate freely. When the roll 5 is advanced, however, (in the direction of the arrow in Fig. 2) it will become jammed between the casing 1 and shaft 2, owing to the convergence of the depression 6 with the inner surface of the casing, and thereby cause said casing and shaft to rotate together. To hold this clutch normally open, a stop 7 is arranged in the path of a projection 8 from the ring 3, and holds back said ring against the tension of a spring 9, so that the roll 5 is kept in the depression 6.

A mutilated gear 10 is carried on the periphery of the clutch casing 1 to engage a pinion 11 arranged to drive the master wheel of the computing machine. The number of teeth on said mutilated gear varies according to the numeral key controlling the clutch, as for instance, the key usually marked "1" controls a clutch having a gear with one tooth; the key usually marked "2" controls a clutch having a gear with two teeth, etc.

The shaft 2, which rotates the clutch casings 1, is driven at high speed in order that the computation be completed promptly; but, when the clutch casings rotate so rapidly and strike the stop 7, there is apt to be considerable rebound. When the casing 1 rebounds, the spring 9 causes the gripping roll 5 to lock or close the clutch again, only to strike the releasing stop 7 again. The repeated opening and closing of the clutch produces a disagreeable chattering noise.

In computing machines, the load on different clutches varies very much with the individual clutch, because, as has been stated, the number of teeth 10 is proportional to the digit represented by the numeral key depressed, and obviously there is much more load on the clutch in turning a computing wheel through ten digit spaces than through only one or two. In addition to this, the load on each individual clutch will vary greatly because at some times a long string of " 9's " will have " 1 " added to them, thus causing every one of said " 9's " to be turned to read " 0 ", viz., to carry over. This carry over turning requires great power. The result, therefore, will be that the light motor which is commonly employed in computing machines will be materially slowed by the heavier loads on the clutches, and therefore the stop 7 will be struck by the projection 8 sometimes when the clutch is turning very rapidly and sometimes when the clutch is turning at a very low speed compared with the normal speed. Since the clutch proper is arrested by the spring 9 when the projection 8 strikes the stop 7, the result will be that at varying speeds the clutch proper will come to rest at different points, because sometimes the arresting of the clutch will compress the spring 9 to one extent and sometimes to another. To meet these varying conditions, the clutch is provided with a plurality of teeth 13 to prevent any backward motion whatsoever, no matter in what position the clutch may be when the spring 9 finally brings it to rest. This prevention of the backward rotation of the clutch and the holding of the projection by the stop 7 positively hold the dog carrier 3 so that the clutch is released. Were it not for the plurality of teeth 13, the clutch sometimes would rebound sufficiently to cause the gripping roll 5 to lock again and thus injure the machine. The dog 12 may ride on the periphery of the casing during the revolution of the clutch, when not in engagement with the teeth.

Variations may be resorted to within the scope of the invention, and portions of the improvements may be used without others.

Having thus described my invention, I claim:

1. The combination with a shaft forming a driving member, of a driven member encircling said shaft, a normally ineffective dog adapted to lock said shaft to said driven member, a dog carrier loose on said shaft, a projection on said carrier, a spring between said carrier and the driven member, a catch adapted to arrest said driven member by holding said projection so as to hold the dog at ineffective position, a pawl for preventing backward movement of said driven member under tension of said spring, and a plurality of teeth on said driven member coöperating with said pawl.

2. The combination with a shaft and a driven member encircling it, of a gripping roll between said shaft and said member, a dog carrier loose on said shaft to hold said roll in effective or ineffective position, a projection on said dog carrier extending beyond said driven member, a stop for holding said dog carrier by said projection in ineffective position, a spring between said projection and said driven member tending to throw said carrier to cause its roll to grip and whereby the clutch is arrested after a revolution, a plurality of teeth on said driven member, and a pawl adapted to coöperate with said teeth to hold said driven member in any position it is arrested with the spring compressed between the projection and the driven member.

WALTER E. BARNARD.

Witnesses:
JULIUS DUCKSTINE,
TITUS H. IRONS.